US011002289B2

(12) United States Patent
Baumann et al.

(10) Patent No.: US 11,002,289 B2
(45) Date of Patent: May 11, 2021

(54) COOLING SYSTEM FOR A ROTARY ELECTRIC MACHINE

(71) Applicant: Caterpillar Inc., Deerfield, IL (US)

(72) Inventors: Jonathan M. Baumann, Hanna City, IL (US); Rodwan T. Adra, Peoria, IL (US); Timothy J. Schlack, Washington, IL (US); Gregory T. Austin, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 30 days.

(21) Appl. No.: 16/114,859

(22) Filed: Aug. 28, 2018

(65) Prior Publication Data

US 2020/0072244 A1 Mar. 5, 2020

(51) Int. Cl.
| | | |
|---|---|---|
| *H02K 9/19* | (2006.01) | |
| *H02K 1/20* | (2006.01) | |
| *H02K 3/24* | (2006.01) | |
| *F04D 29/58* | (2006.01) | |
| *F04D 29/26* | (2006.01) | |
| *H02K 1/32* | (2006.01) | |

(52) U.S. Cl.
CPC ......... *F04D 29/5806* (2013.01); *F04D 29/26* (2013.01); *H02K 1/20* (2013.01); *H02K 1/32* (2013.01); *H02K 9/19* (2013.01)

(58) Field of Classification Search
CPC .. H02K 1/20; H02K 9/19; H02K 5/24; H02K 3/24; H02K 9/005; H02K 1/32; H02K 3/487
USPC ........ 310/52, 54, 58, 59, 60 A, 64, 214, 215
See application file for complete search history.

(56) References Cited

U.S. PATENT DOCUMENTS

| | | | |
|---|---|---|---|
| 6,777,836 B2 | 8/2004 | Tong et al. | |
| 8,053,938 B2 | 11/2011 | Pal et al. | |
| 9,621,011 B2 | 4/2017 | Wirsch, Jr. et al. | |
| 2003/0098630 A1* | 5/2003 | Owada ..................... | H02K 3/24 310/194 |
| 2009/0127946 A1* | 5/2009 | Fee .......................... | H02K 5/20 310/64 |
| 2012/0080982 A1* | 4/2012 | Bradfield ................. | H02K 1/20 310/60 A |

(Continued)

FOREIGN PATENT DOCUMENTS

| | | |
|---|---|---|
| GB | 2526253 A | 11/2015 |
| JP | 2004236376 | 8/2004 |
| JP | 2010057277 | 3/2010 |

(Continued)

*Primary Examiner* — Quyen P Leung
*Assistant Examiner* — Alexander Moraza
(74) *Attorney, Agent, or Firm* — Leydig, Voit & Mayer, LTD.

(57) ABSTRACT

A rotary electric machine includes a stator, a rotor, a plurality of coils, and a plurality of flow enhancement members. Each coil has a compound outer surface along major sections thereof with an insulating layer disposed therealong. The compound outer surfaces of each pair of adjacent coils define a channel extending along adjacent major sections of each adjacent pair of coils. One of the flow enhancement members is disposed within each channel between the adjacent major sections of each pair of adjacent coils, with each flow enhancement member defining a gap between the compound outer surface of one of the coils and the flow enhancement member through which cooling fluid may flow.

19 Claims, 7 Drawing Sheets

(56) References Cited

U.S. PATENT DOCUMENTS

2013/0076170 A1   3/2013  Adra et al.
2017/0155295 A1*  6/2017  Adra .................... H02K 15/045

FOREIGN PATENT DOCUMENTS

JP        2016208757      12/2016
KR        20160084710 A    7/2016

* cited by examiner

COOLING SYSTEM FOR A ROTARY ELECTRIC MACHINE

TECHNICAL FIELD

This disclosure relates generally to a rotary electric machine and, more particularly, to a cooling system for a rotary electric machine.

BACKGROUND

Work machines may be powered by electrical propulsion systems. The electrical propulsion systems sometimes include electric drive traction systems that provide driving forces to traction devices of the work machines. In some electric drive traction systems, switched reluctance motors are used to provide the driving force.

Switched reluctance motors may have various motor topologies (e.g., the number of stator poles, the number of coils, and the number of rotor poles). In addition, a switched reluctance motor may be configured with a plurality of phases (e.g., 2 phases, 3 phases, 4 phases, or more). A switched reluctance motor may have a plurality of stator poles, each with a winding of electrically conductive wires or coil positioned therearound. The number of wires and the configuration of the coil is one factor that affects the efficiency of the operation of the switched reluctance motor.

The operation of a switched reluctance motor may generates a significant amount of heat within the motor. Cooling of the switched reluctance motors may be performed in many manners. In some instances, convection cooling systems are provided to draw heat from the switched reluctance motors. Improvements in cooling of switched reluctance motors is desirable to increase power generation, efficiency and lifespan.

U.S. Pat. No. 9,621,011 discloses a switched reluctance motor having a stator with a plurality of stator poles having windings thereon and a rotor rotatable relative to the stator. A stator sleeve is located about the stator core and includes a convection reservoir extending along and in a thermally conductive confronting relationship with at least a portion of the windings. A delivery reservoir is provided with a plurality of transfers ports fluidly coupling the convection reservoir with the delivery reservoir.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a rotary electric machine includes a stator, a rotor, a plurality of coils, and a plurality of flow enhancement members. The stator having stator body including a plurality of stator poles extending radially away from the stator body. The rotor being positioned within the stator and having a plurality of rotor poles. One coil is positioned about each stator pole and each coil has a plurality of electrically conductive wires defining a group of wires with the group of wires being wrapped around its respective stator pole to define a plurality of turns of the group of wires about the stator pole. Each coil further has a pair of major sections and a pair of minor sections, with each minor section interconnecting the pair of major sections and each major section being positioned adjacent a major section of an adjacent coil. The coil further includes an inner surface in proximity to its respective stator pole, a compound outer surface along the pair of major sections, an insertion end positioned generally adjacent the stator body, and a rotor end positioned opposite the insertion end. The insertion end and the rotor end interconnect the inner surface to the compound outer surface. The compound outer surface has a first leg section and a second leg section at an angle to each other, with the first leg section extending generally from the insertion end towards the rotor end and the second leg section extending from the rotor end generally towards the first leg section. An insulating layer is disposed along the compound outer surface of the coil. The compound outer surfaces of each pair of adjacent coils define a channel extending along adjacent major sections of each adjacent pair of coils. One of the flow enhancement members is disposed within each channel between the adjacent major sections of each pair of adjacent coils, with each flow enhancement member defining a gap between the compound outer surface of one of the coils and the flow enhancement member.

In another aspect, a rotary electric machine includes a stator, a rotor, a plurality of coils, a plurality of flow enhancement members, a port, and a fluid system. The stator having stator body including a plurality of stator poles extending radially away from the stator body. The rotor being positioned within the stator and having a plurality of rotor poles. One coil is positioned about each stator pole and each coil has a plurality of electrically conductive wires defining a group of wires with the group of wires being wrapped around its respective stator pole to define a plurality of turns of the group of wires about the stator pole. Each coil further has a pair of major sections and a pair of minor sections, with each minor section interconnecting the pair of major sections and each major section being positioned adjacent a major section of an adjacent coil. The coil further includes an inner surface in proximity to its respective stator pole, a compound outer surface along the pair of major sections, an insertion end positioned generally adjacent the stator body, and a rotor end positioned opposite the insertion end. The insertion end and the rotor end interconnect the inner surface to the compound outer surface. The compound outer surface has a first leg section and a second leg section at an angle to each other, with the first leg section extending generally from the insertion end towards the rotor end and the second leg section extending from the rotor end generally towards the first leg section. A rigid insulating layer is disposed along the compound outer surface of the coil. The compound outer surfaces of each pair of adjacent coils define a channel extending along adjacent major sections of each adjacent pair of coils. One of the flow enhancement members is disposed within each channel between the adjacent major sections of each pair of adjacent coils, with each flow enhancement member defining a gap between the compound outer surface of one of the coils and the flow enhancement member. The port is adjacent at least one end of the channel and the fluid system includes a cooling fluid that flows through the gap and through the port.

DETAILED DESCRIPTION

Figure 1:
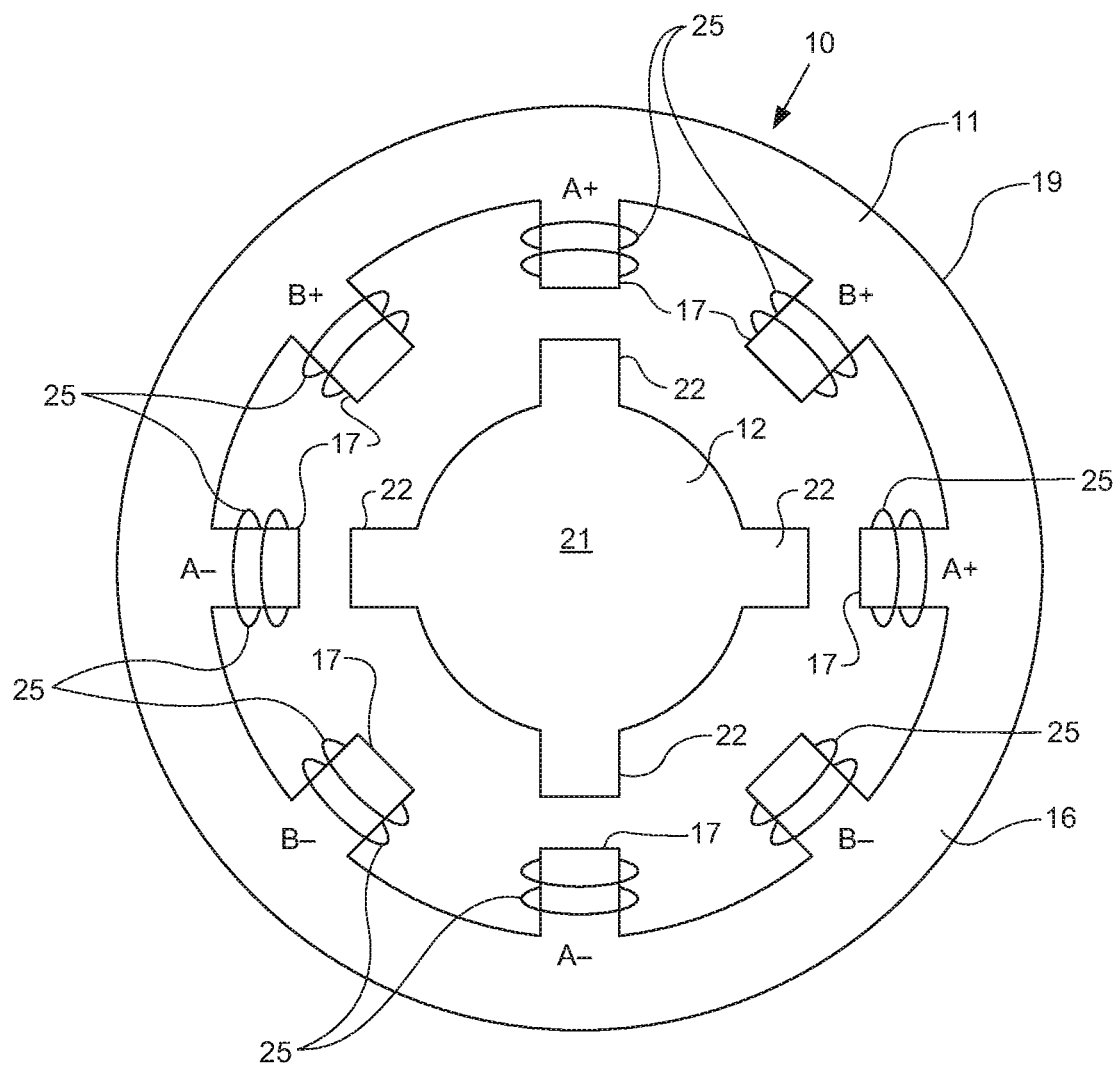
FIG. 1 is a diagrammatic end view of a portion of a switched reluctance motor.
Figure 2:
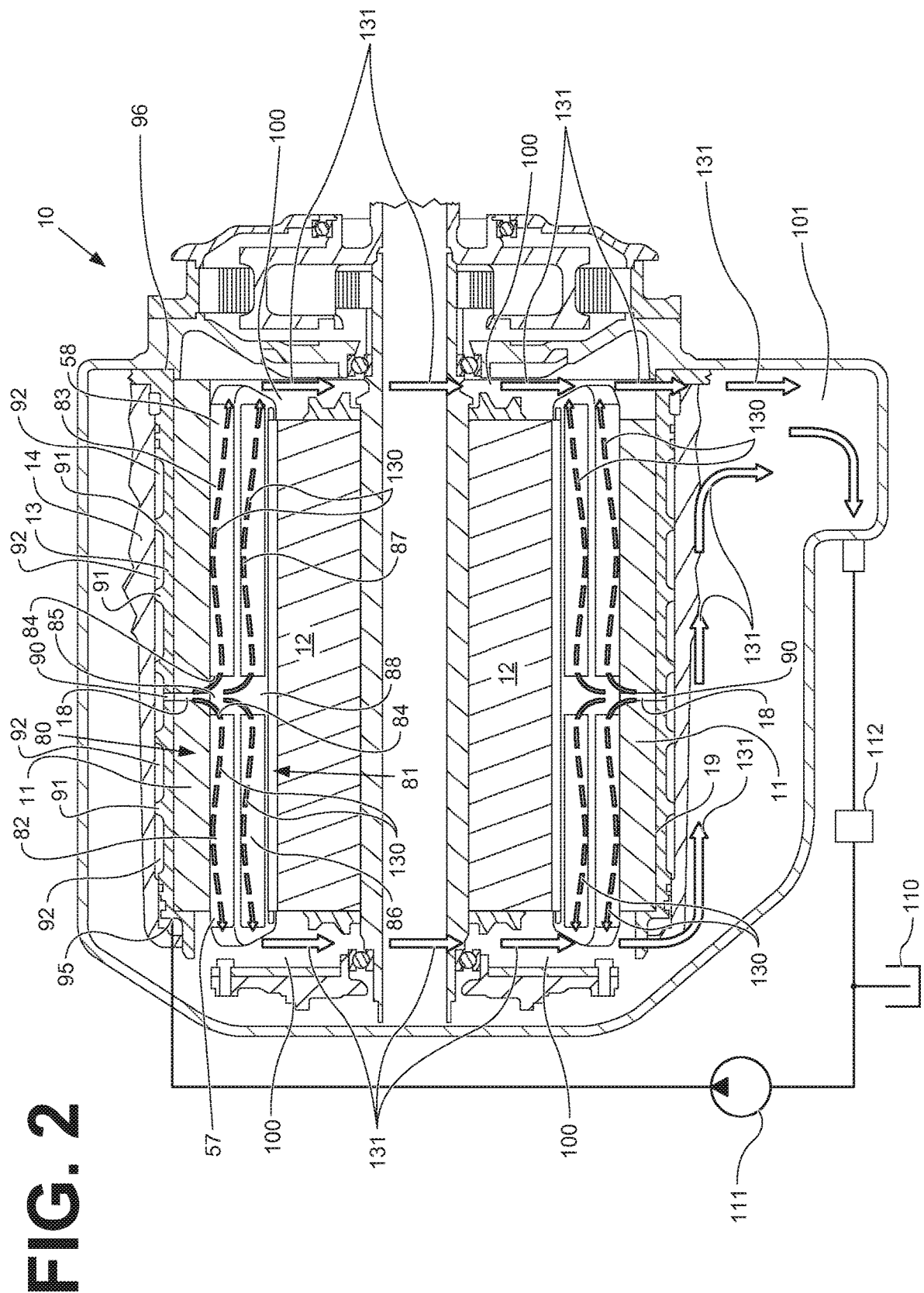
FIG. 2 is a section view of a switched reluctance motor incorporating the principles disclosed herein.

Referring to FIGS. 1-2 a rotary electric machine such as a switched reluctance motor 10 includes a stator 11 and a rotor 12 rotatably disposed therein. An annular stator jacket 13 surrounds and circumferentially engages an outer circumferential surface 19 of the stator 11. An outer housing 14 surrounds and circumferentially engages the outer circumferential surface of the stator jacket 13.

The stator 11 has a stator body 16 and a plurality of stator poles 17 extending radially inward from the body. The stator 11 may be formed by stacking a plurality of one-piece continuous annular iron members (not shown) together. A layer of insulative material (not shown) may be provided between each iron member.

The rotor 12 has a rotor body 21 with a plurality of rotor poles 22 extending radially outward from the body. The rotor 12 has no windings or magnets. The rotor 12 may be formed of a stack of vertically laminated iron, one-piece continuous annular members (not shown). Rotors 12 having other structures and configurations are contemplated. In addition, while the motor of FIG. 2 is depicted as a switched reluctance motor, the concepts disclosed herein are applicable to other rotary electric machines such as a switched reluctance generator or one in which the rotor 12 has permanent magnets or some other structure or configuration.

As depicted, the stator 11 includes eight radially inwardly projecting stator poles 17 and the rotor 12 includes four radially outwardly projecting rotor poles 22. The number of phases of the switched reluctance motor 10 as well as the number of stator poles 17 and rotor poles 22 is exemplary only and is not intended to be limiting.

Each stator pole 17 has a conductive winding or coil 25 wrapped therearound. The coils 25 positioned about the stator poles 17 of each group of a phase set (A+, A− and B+, B−) are electrically connected and may be configured as part of an electrical circuit, either in parallel or in series.

Figure 3:
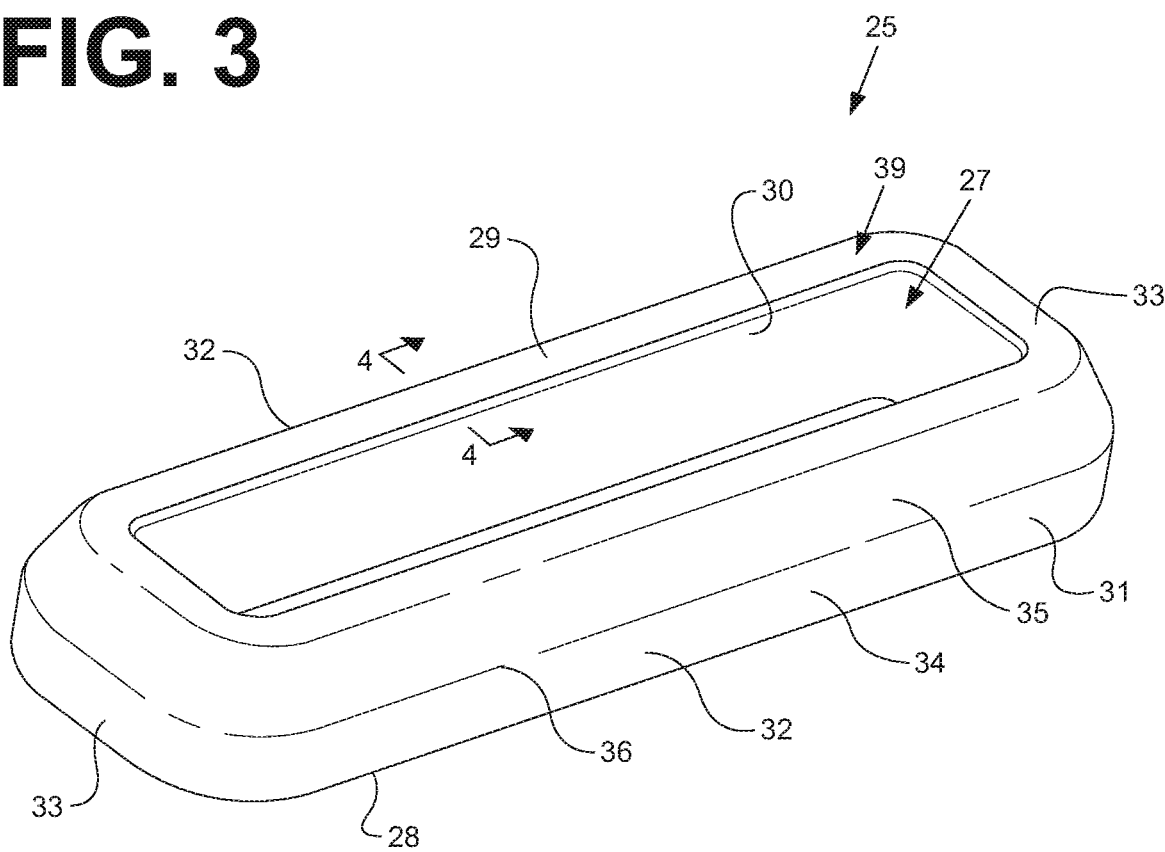
FIG. 3 is a perspective view of a coil used with the switched reluctance motor of FIG. 2.
Figure 4:
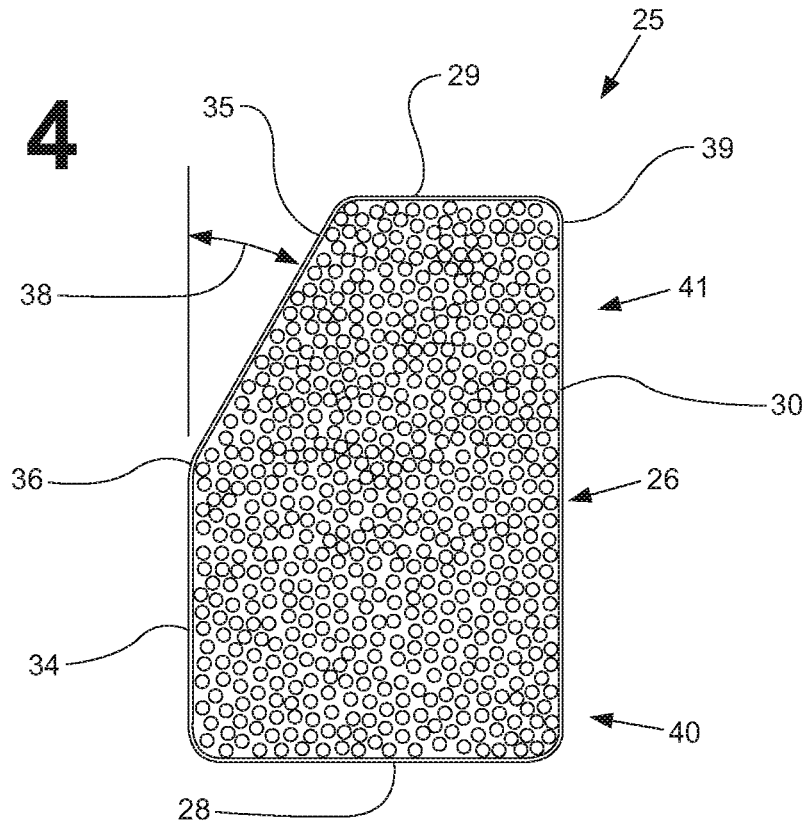
FIG. 4 is section of the coil of FIG. 3 taken generally along line 4-4.

Referring to FIGS. 3-4, coil 25 may be formed of a plurality of electrically conductive wires 26 that define a group of wires that are wrapped in a generally oval manner around the central opening 27 a predetermined number of times or turns. The central opening 27 generally corresponds in size to the cross section of the stator poles 17 so that the coil 25 may be slid onto the stator pole during the fabrication of the switched reluctance motor 10. Each coil 25 includes an insertion end 28 to be positioned generally adjacent the stator body 16 of the stator 11, and a rotor end 29 to be positioned opposite the insertion end and generally adjacent the end face of the stator pole 17. An inner surface 30 is configured to be positioned adjacent or in proximity to its respective stator pole 17 and a compound outer surface 31 generally faces opposite the inner surface. Accordingly, when viewed from the insertion end 28 or the rotor end 29, both the inner surface 30 and the outer surface 31 define generally oval surfaces. The insertion end 28 and the rotor end 29 interconnect the inner surface 30 to the outer surface 31. Each coil 25 has a pair of major sections 32 and a pair of minor sections 33, with each minor section interconnecting the pair of major sections.

The compound outer surface 31 includes a first leg section 34 and a second leg section 35. The first leg section 34 extends from the insertion end 28 of the coil 25 towards the rotor end 29. The second leg section 35 extends from the rotor end 29 towards the insertion end 28 and intersects with the first leg section 34 at intersection 36. The first leg section 34 and the second leg section 35 are positioned or configured at an angle 38 to each other at intersection 36. Accordingly, the first leg section 34 defines a first section 40 having a generally uniform width (i.e., the distance from the inner surface 30 to the outer surface 31). The second leg section 35 defines a second section 41 having a tapering width. The angle 38 may be based or dependent upon or the number of stator poles 17 of stator 11. In one embodiment, the angle 38 may be generally equal to 360 degrees divided by the number of stator poles 17. The coil 25 depicted in FIGS. 3-4 may be used with a stator 11 having twelve stator poles 17 and thus the angle 38 is configured as approximately 30 degrees. In many applications, the angle 38 may be between approximately 15 degrees and 60 degrees.

Although depicted in the drawings with the compound outer surface 31 extending around the entire outer surface of the coil 25, in some configurations only the major sections 32 may include the compound outer surface 31.

A heat resistant, electrically insulating layer or wrap 39 may be applied to the outer surface 31 of coil 25 along the major sections 32. In an example, the insulating wrap 39 may be formed of one or more materials such as Nomex®, Mylar®, Kapton® mica, or others with similar properties. Further, the wrap 39 may be formed of different materials or combinations of materials and/or of different thicknesses at different locations about the coil 25. In some embodiments, the wrap 39 may form a rigid outer surface along all or a portion of the coil 25.

As depicted in FIG. 4, each electrically conductive wire 26 has a generally circular cross-section. The electrically conductive wires 26 may have a non-circular cross-section such as oval, square or rectangular in some configurations. The electrically conductive wires 26 may be formed of a highly conductive, flexible material, such as copper, and have a layer of insulation thereon. In an embodiment, magnet wires having a layer of enamel insulation may be used.

In an embodiment, a coil 25 may be fabricated with a pair of major sections 32 of approximately eight inches in length and a pair of minor sections 33 of approximately two inches in length. The group of wires may include seven electrically conductive wires 26, each having a diameter of approximately 0.05 inches, and may be wrapped around the central opening 27 fifty-six times. In other similar embodiments, the group of wires may include between approximately five and nine electrically conductive wires 26. Other numbers of electrically conductive wires 26 may be used if desired.

The electrically conductive wires 26 may also have other diameters. In another embodiment, the electrically conductive wires 26 may be approximately 15-18 gauge wire. Other numbers of electrically conductive wires 26 and those having other diameters may also be used. The number of turns or times that the group of wires is wrapped around the central opening 27 may be determined or set based upon the desired electrical performance of the switched reluctance motor 10. Accordingly, the number of turns about the central opening 27 may be adjusted as desired.

The group of wires that is wrapped around the central opening 27 is formed of individual electrically conductive wires 26 that may also be twisted together. The twisting of the wires may be achieved in any desired manner During assembly, the angle 38 between the first leg section 34 and the second leg section 35 permits the insertion end 28 of each coil 25 to be slid onto a stator pole 17 without engaging or contacting an adjacent coil that is mounted on an adjacent stator pole. In other words, the angle 38 creates a clearance or opening for the first leg section 34 of an adjacent coil 25 to pass through.

Figure 5:
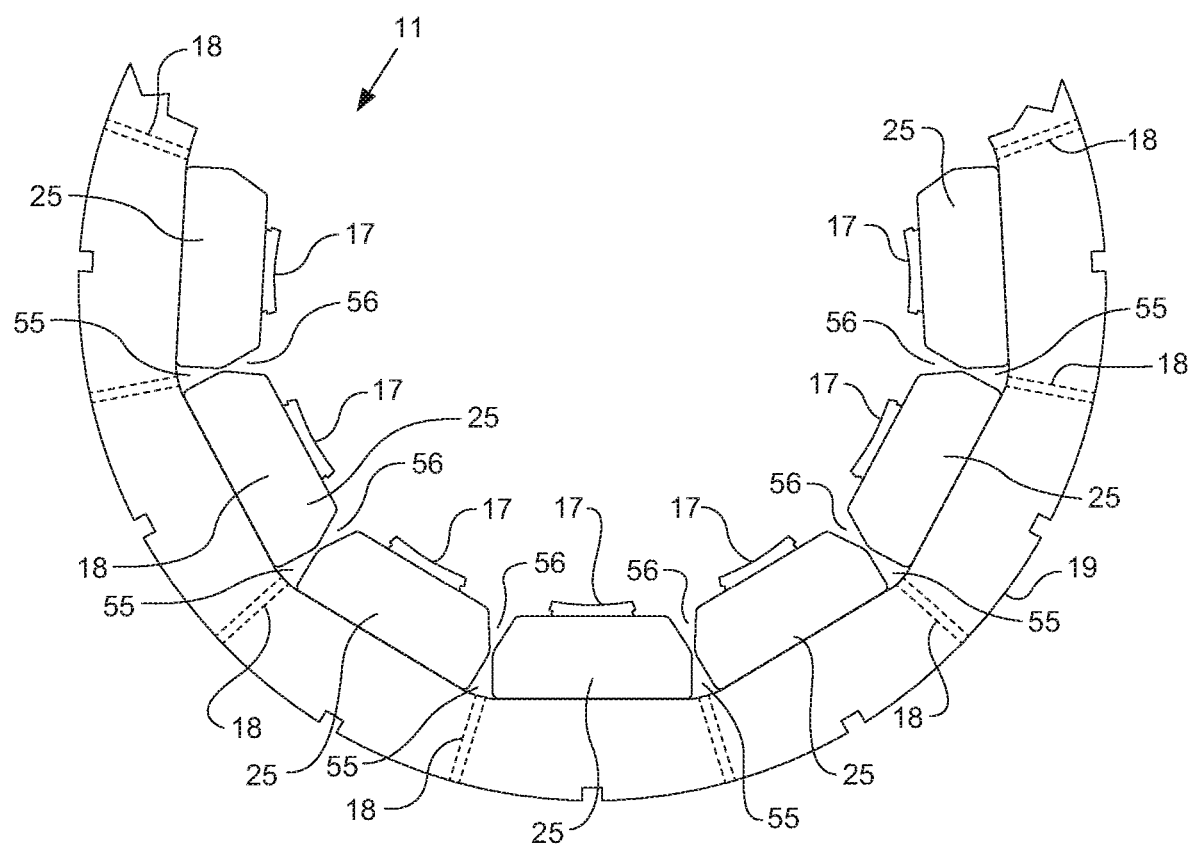
FIG. 5 is fragmented end view of a portion of the stator used with the switched reluctance motor of FIG. 2 with the coils of FIG. 3 disposed thereon and with flow enhancement members removed for clarity.

Referring to FIG. 5, upon mounting the coils 25 on the stator poles 17, the space between the first leg sections 34 of adjacent coils define a generally V-shaped first channel 55 adjacent the stator body 16 that extends along the entire length of the adjacent major sections 32 of the pairs of adjacent coils. The wider portion of the V-shaped first channel 55 is disposed adjacent the stator body 15. The space between the second leg sections 35 of adjacent coils defines a generally V-shaped second channel 56 that also extends along the entire length of the adjacent major sections 32 of the pairs of adjacent coils. The V-shaped second channels 56 are configured in an opposite orientation to the V-shaped first channels 55 so the narrowest portions of the channels are closest together. In other words, the compound outer surface 31 defines the V-shaped first channels 55 and V-shaped second channels 56 and the apexes of each pair of adjacent V-shaped first and second channels 55, 56 are adjacent to each other. The V-shaped first channels 55 and V-shaped second channels 56 are in fluid communication with each other through the narrow portions of the channels.

During operation of the switched reluctance motor 10, rotation of the rotor 12 is achieved by the sequential excitation or energization of adjacent sets of stator poles 17 by supplying voltage pulses of a desired magnitude and duration to generate a DC current within the coils 25 of the stator poles 17. Energization of the stator poles 17 creates magnetic flux towards which the rotor poles 22 are attracted, which tends to align the rotor poles with the energized stator poles 17. As the rotor poles 22 become aligned with the energized stator poles 17, the voltage pulse and thus the DC current to the energized poles is terminated and subsequently supplied to the next sequential stator poles 17. The rotor poles 22 are then attracted to the next set of sequential stator poles 17, which causes continued rotation of the rotor 12. This process is continued during operation of the switched reluctance motor 10. Torque is generated by the tendency of rotor poles 22 to align with energized stator poles 17. Continuous torque may be generated by synchronizing excitation of consecutive stator poles 17 with the instantaneous position of rotor poles 22.

As a result of the operation of the switched reluctance motor 10, heat is generated within the motor. Cooling the switched reluctance motor 10 may result in more efficient operation and a longer life of the motor. In some instances, oil, air, or another cooling fluid or medium may be routed through the V-shaped first channels 55 between the first leg sections 34 of adjacent coils 25 and the V-shaped second channels 56 between the second leg sections 35 of the adjacent coils to enhance cooling within the switched reluctance motor 10.

Figure 6:
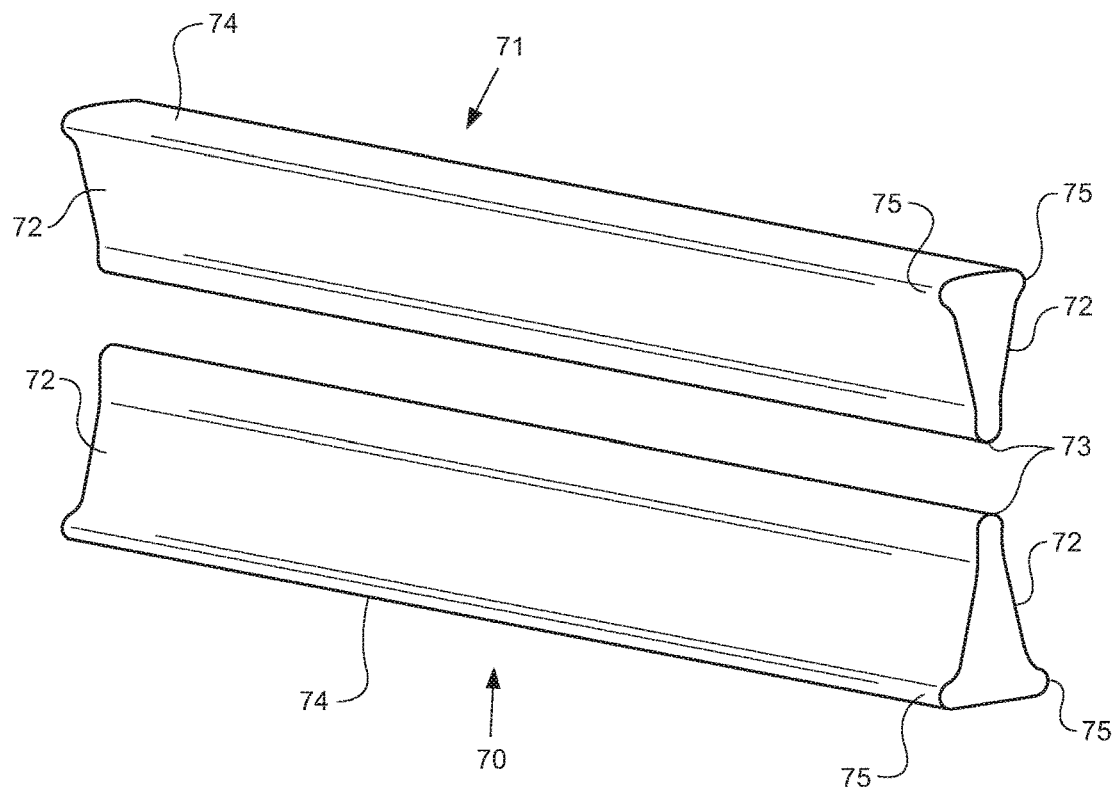
FIG. 6 is a perspective view of a pair of flow enhancement members.
Figure 7:
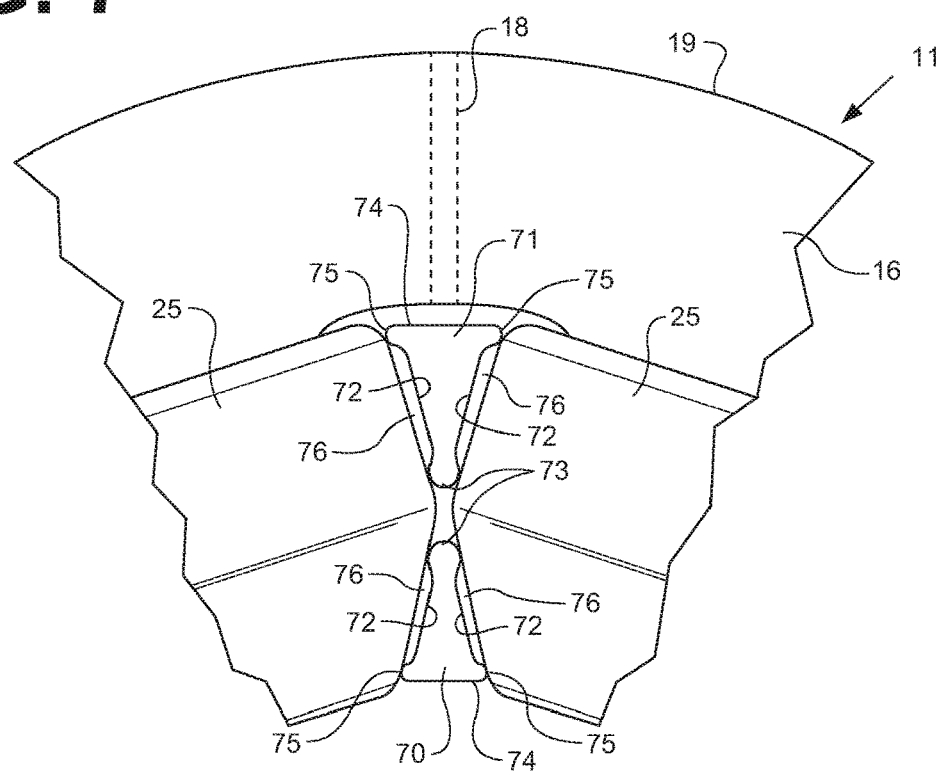
FIG. 7 is an enlarged end view of a portion of the stator of FIG. 5 with flow enhancement members disposed thereon.

In general, it may be desirable to maximize the velocity of the flow of a cooling fluid such as oil in order to reduce the thickness of the boundary layer along the surface of the components being cooled. Reducing the thickness of the boundary layer will, in general, improve the efficiency of the heat transfer process. Referring to FIGS. 6-7, to do so, one or more first flow control or flow enhancement members 70 may be disposed within each of the V-shaped first channels 55 and one or more second flow control or flow enhancement members 71 may be disposed within each of the V-shaped second channels 56. The first and second flow enhancement members 70, 71 are disposed between adjacent pairs of coils 25 to reduce the space or volume of the channels.

Although similar in shape, the V-shaped first channels 55 and the V-shaped second channels 56 are depicted with slightly different sized cross-sections. Accordingly, the first flow enhancement members 70 may have a slightly different sized cross-section as compared to that of the second flow enhancement members 71. Since the functionality of the first and second flow enhancement members 70, 71 is identical, only one is described in detail herein.

The first flow enhancement members 70 are generally elongated and are configured with a cross-section to generally match the cross-sections of the V-shaped first channels 55 and V-shaped second channels 56, respectively, between adjacent coils 25. More specifically, the first flow enhancement members 70 have a generally triangular cross-section with a pair of identical angled legs 72 that intersect with a first enlarged portion 73. The first enlarged portion 73 may be generally circular and functions as a first standoff or spacer. A base 74 extends between the angled legs 72 at the end opposite the enlarged portion 73. A second enlarged portion 75 is disposed at the intersection of each of the angled legs 72 and the base 74. The second enlarged portions are somewhat arcuate and functions as a second standoff or spacer.

The first and second flow enhancement members 70, 71 may be formed from any desired material. In one embodiment, the flow enhancement members 70, 71 may be formed of a thermally and electrically insulative material such as a plastic or resin.

As best seen in FIG. 7, the first enlarged portion 73 of the first flow enhancement members 70 engages the first leg sections 34 of the coils 25 adjacent the intersection 36 and the second enlarged portions 75 each engage one of the first leg sections adjacent the insertion end 28 of the coils. The first enlarged portion 73 and the second enlarged portions 75 operate as spacers or standoffs to space the angled legs 72 from the first leg sections 34 of their respective coils 25 to create a space or gap 76 between each first leg section 34 and its adjacent angled leg 72. The gap 76 functions as a relatively narrow path through which cooling fluid may flow.

In one embodiment, the gap 76 may be approximately 1.0 mm wide. In another embodiment, the gap 76 may be no more than approximately 1.0 mm wide. In still another embodiment, the gap 76 may be no more than approximately 1.5 mm wide. In a further example, the gap 76 may be between approximately 0.5 mm and 2.0 mm. Gaps 76 of other sizes and ranges are contemplated.

A second flow enhancement member 71 is disposed within the V-shaped second channels 56 in a similar manner but with the first enlarged portion 73 engaging the second leg sections 35 of the coils 25 adjacent the intersection 36 and the second enlarged portions 75 each engaging one of the second leg sections adjacent the rotor end 29 of the coil 25. In a similar manner, the first enlarged portion 73 and the second enlarged portions 75 space the angled legs 72 from the second leg sections 35 of their respective coils 25 to create a space or gap 76 between each second leg section 35 and its adjacent angled leg 72.

In other embodiments, the V-shaped first channels 55 and the V-shaped second channels 56 may have identically sized cross-sections. In such case, the first and second flow enhancement members 70, 71 may be identical. Further, if the V-shaped first channels 55 and the V-shaped second channels 56 are differently configured, it may be desirable to provide the first and second flow enhancement members 70, 71 with different configurations that match the V-shaped channel in which the member is disposed.

The first and second flow enhancement members 70, 71 may be retained or secured within the V-shaped first and second channels 55, 56 in any desired manner. In one embodiment, the first and second flow enhancement members 70, 71 may include an opening or bore 77 (FIGS. 9-12) extending therethrough. A retention member such as Kevlar rope may extend through the bore 77 and be wrapped around the coils 25 to retain the first and second flow enhancement members 70, 71 within the V-shaped first and second channels 55, 56.

As a result of the configuration of the V-shaped first and second channels 55, 56 and the first and second flow enhancement members 70, 71, the area of the gaps 76 through which cooling fluid may flow between the coils 25 is substantially reduced. Accordingly, the velocity of the cooling fluid flowing through the gaps 76 is substantially increased, thus reducing the thickness of the boundary layer adjacent the first leg section 34 and the second leg section 35 of the coils 25 and increasing the efficiency of the heat transfer process.

Cooling fluid may be supplied by a fluid system through the gaps 76 adjacent the coils 25 in any desired manner to achieve the desired cooling result. In a relatively simple example that is not shown, a first end of the V-shaped first and second channels 55, 56 may be configured to function as inlet ports and the opposite second end of the first and second channels may be configured to function as outlet ports. Cooling fluid may be directed through the gaps 76 along the V-shaped first and second channels between the first end and the second end to cool the coils 25.

Referring to FIG. 2, a switched reluctance motor 10 is depicted with a more complex cooling system. As describe in more detail below, cooling fluid is first supplied in a circumferential manner between the stator jacket 13 and the outer housing 14 and then radially through the stator jacket and the stator body 16. The cooling fluid passes axially through the gaps 76 associated with the V-shaped first and second channels 55, 56 and out of both the first and second ends 57, 58 of the channels. Other manners of supplying cooling fluid are contemplated.

Each of the V-shaped first and second channels 55, 56 includes a non-continuous flow enhancement member therein. More specifically, a first segment 82 of a first non-continuous flow enhancement member 80 extends axially from the first end 57 (at the left-hand side of FIG. 2) of the V-shaped first channel 55 partway towards the opposite second outer end 58 (at the right-hand side of FIG. 2) of the first channel. Similarly, a second segment 83 of the first non-continuous flow enhancement member 80 extends axially from the second end 58 of the V-shaped first channel 55 partway towards the opposite first end 57 of the first channel. The V-shaped first channel 55 and the first and second segments 82, 83 of the first non-continuous flow enhancement member 80 are configured or dimensioned so that the inner ends 84 of the segments are spaced apart and define an inner reservoir 85 between the first and second segments within the first channel.

As described above, with respect to the first and second flow enhancement members 70, 71, the first and second segments 82, 83 of the first flow enhancement member 70 are spaced from the first leg sections 34 of the coils 25 to define the gap 76 but such gap is not visible in FIG. 2. However, the flow of the cooling fluid through the gap 76 from the inner reservoir 85 is depicted schematically by arrows 130 for clarity.

A first segment 86 of the second non-continuous flow enhancement member 81 and a second segment 87 of the second flow enhancement member are disposed within the V-shaped second channel 56 in a similar manner with the inner reservoir 85 of the V-shaped first channel 55 radially aligned with the inner reservoir 88 of the V-shaped second channel. The inner reservoir 85 of the V-shaped first channel 55 is in fluid communication with the inner reservoir 88 of the V-shaped second channel 56.

Figure 8:
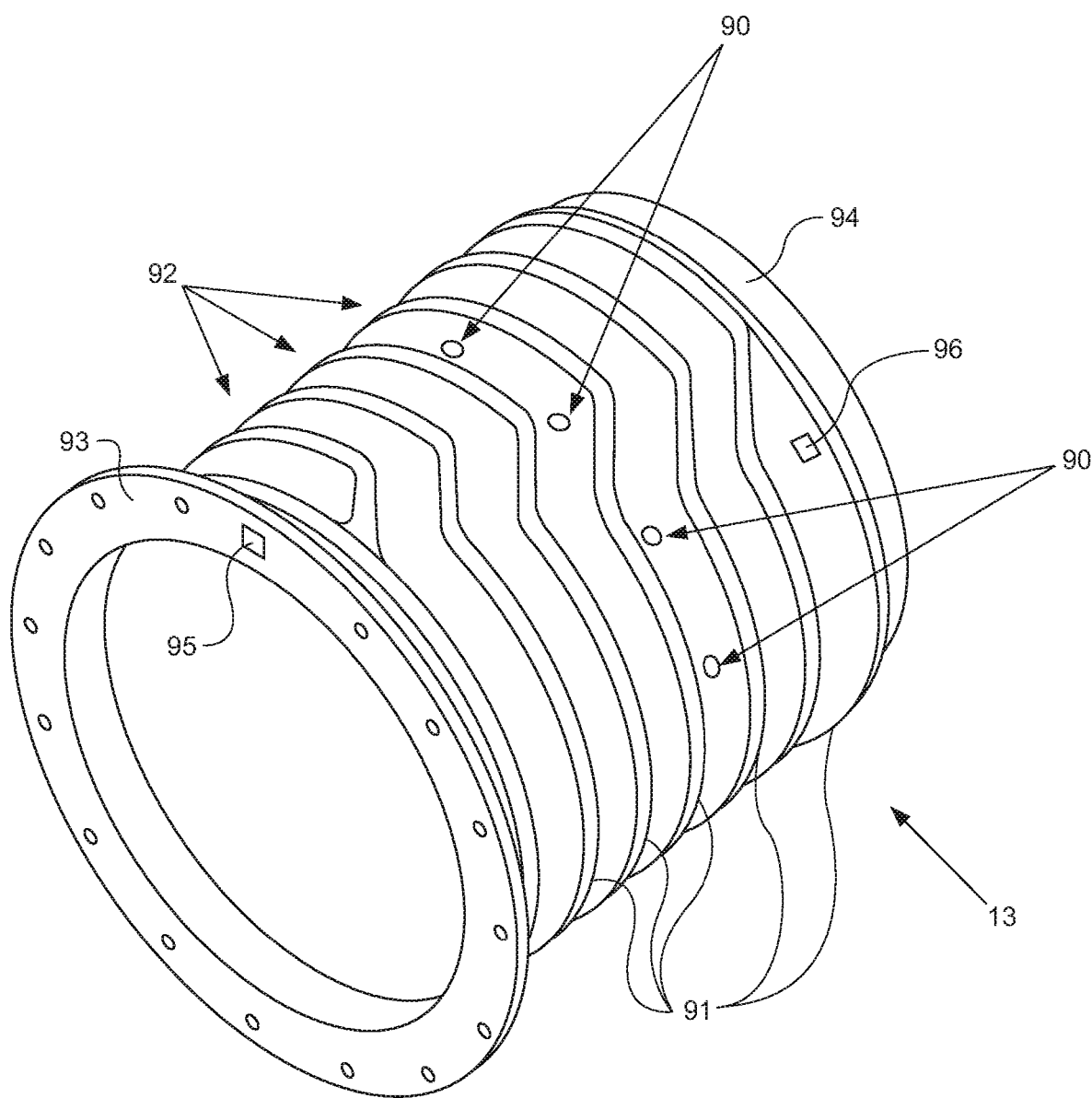
FIG. 8 is a perspective view of a stator jacket used with the switched reluctance motor of FIG. 2.

A plurality of spaced apart openings or bores 18 (FIGS. 2, 5, 7) extend radially through the stator body 16 midway between the stator poles 17 and may function as an inlet port. Each bore 18 is aligned, and thus in fluid communication, with one of the inner reservoirs 85 of the V-shaped first channels 55. As depicted, the bores 18 function as inlet ports and extend through the stator 11 at approximately a longitudinal midpoint of the V-shaped first and second channel 55, 56. In addition, a plurality of spaced apart openings or bores 90 (FIG. 8) extend radially through the stator jacket 13 with each bore in the stator jacket being aligned with one of the bores 18 that extends through the stator 11.

In an embodiment, the stator jacket 13 may include a plurality of radially projecting circumferential ridges 91 (FIGS. 2, 8) that extend outward and engage the outer housing 14. The circumferential ridges 91 and the inner surface of the outer housing 14 define a plurality of outer cooling channels 92 configured in a continuous spiral manner. In other words, the circumferential ridges 91 define a continuous spiral circumferential channel that extends around the outer surface of the stator jacket 13 a plurality of times beginning at a first edge 93 of the stator jacket and ending at the second, opposite edge 94.

In an embodiment, a first port 95, functioning as a first inlet, may be provided at the first edge 93 of the stator jacket 13 and a second port 96, functioning as a second inlet, may be provided at the second edge 94 of the stator jacket. Upon providing cooling fluid through each of the first and second inlets, the cooling fluid travels in a spiral manner through the continuous circumferential channel towards and through the bores 90 that extend through the stator jacket 13.

The outer housing 14 may include gravity return channels 100 along the ends of the stator 11 and the rotor 12 that operate as cooling fluid return paths. As depicted by arrows 131 in FIG. 2, the cooling fluid passes through the gravity return channels 100 as a result of gravity and travels to a sump 101 within or associated with the outer housing 14. The cooling fluid may flow through a radiator 112 to cool the fluid and then flows back to a tank 110 where it may then be redirected by a pump 111 back to the inlets of the stator jacket 13. The switched reluctance motor 10, radiator 112, the tank 110, and the pump 111 thus define a fluid system for cooling the motor. In one configuration, the tank 110 and pump 111 may be self-contained or configured as part of the switched reluctance motor 10. In another configuration, the tank 110 and pump 111 may be separate components spaced from the switched reluctance motor 10. The radiator 112 may be disposed at any location along the fluid path such as upstream or downstream from or between the tank 110 and pump 111.

Various alternative configurations are contemplated. For example, rather than positioning a non-continuous flow enhancement member 80, 81 within each V-shaped first and second channel 55, 56 and directing cooling fluid radially through the stator jacket 13 and the stator 11 into the inner reservoirs 85, 88 and then axially out of the channels through the gaps 76 between the coils 25 and the non-continuous flow enhancement members 80, 81, a single or continuous flow enhancement member may be positioned within each of the V-shaped first and second channels 55, 56. In such case, one end of each V-shaped channel 55, 56 may operate as an inlet and the opposite end may operate as an outlet with the flow of cooling fluid directed axially through each channel between the inlet and the outlet. In such case, the bores 18 extending through the stator 11 and the bores 90 extending through the stator jacket 13 would be omitted.

If desired, the outer spiral cooling channel 92 may still be provided between the stator jacket 13 and the outer housing 14 in order to provide further cooling for the switched reluctance motor 10. In such a configuration, since the cooling fluid passing through the gaps 76 between the coils 25 and the non-continuous flow enhancement members 80, 81 may be fluidly isolated from the cooling fluid passing through the outer spiral cooling channel 92, the two cooling fluids may or may not be the same fluid.

In another embodiment, the second port 96 fluidly connected to the outer spiral cooling channel 92 may function as an outlet rather than a second inlet. Upon providing cooling fluid through the first port 95, the cooling fluid will travel in a spiral manner through the outer cooling channel 92 with some of the fluid being diverted through the bores 90 that extend through the stator jacket 13 and the rest of the cooling fluid continuing to pass through the spiral cooling channel until reaching the port 96 functioning as an outlet port.

Figure 9:
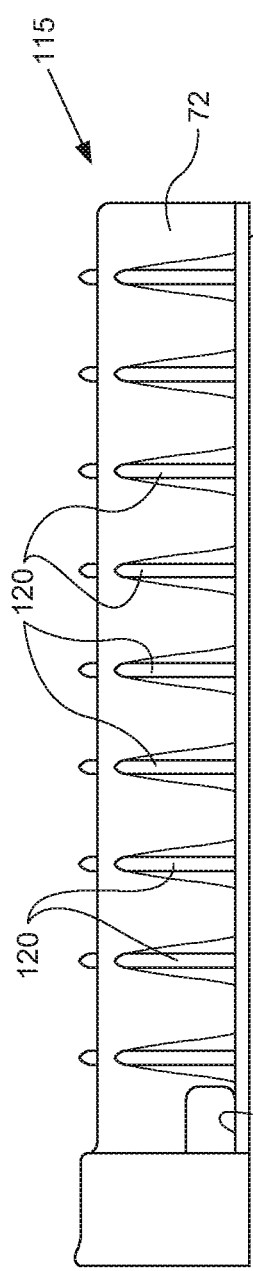
FIG. 9 is side view of a second embodiment of a flow enhancement member.
Figure 10:
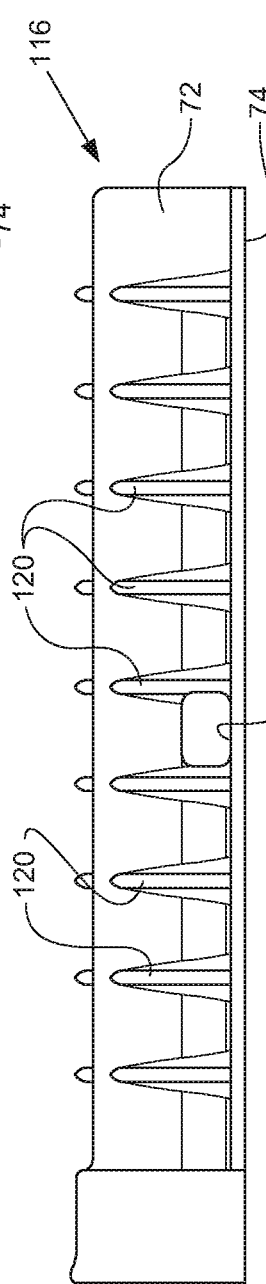
FIG. 10 is side view of a third embodiment of a flow enhancement member.
Figure 11:
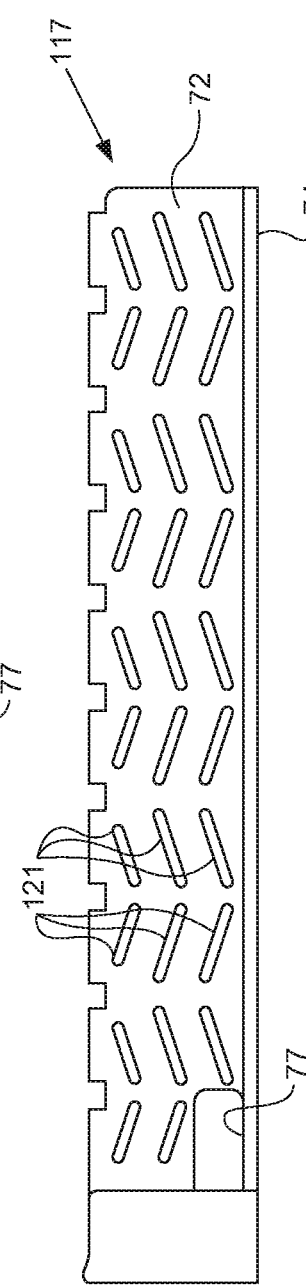
FIG. 11 is side view of a fourth embodiment of a flow enhancement member.
Figure 12:
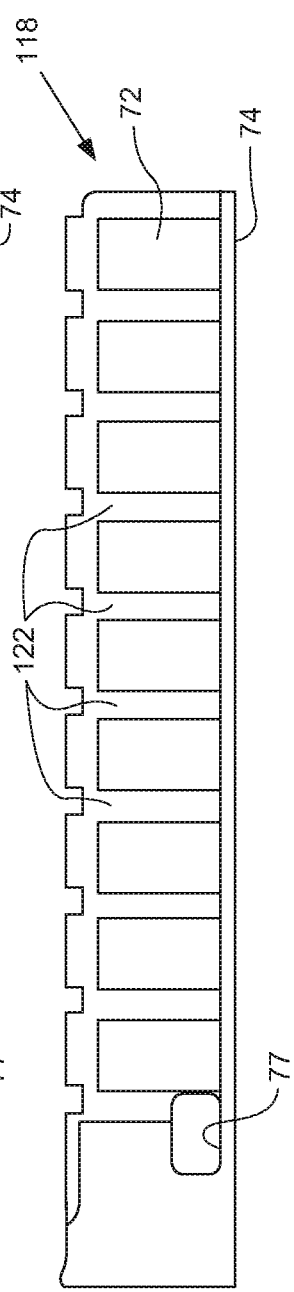
FIG. 12 is side view of a fifth embodiment of a flow enhancement member.

In still other examples, alternate embodiments of the flow enhancement members are contemplated. As depicted in FIG. 9, flow enhancement member 115 may include ribs or fins 120 or other structures that may project outwardly from the side surfaces of the angled legs 72 rather than the smooth outer surfaces depicted in FIGS. 6-7. The fins 120 may extend perpendicular to the direction of flow of the cooling fluid (i.e., perpendicular to the longitudinal axis of the flow enhancement member 115). The flow enhancement member 116 of FIG. 10 is similar to that depicted in FIG. 9 but the opening or bore 77 is disposed towards the center of the flow enhancement member. In FIG. 11, the ribs or fins 121 of the flow enhancement member 117 are somewhat parallel but at a slight angle to the direction of flow of the cooling fluid. FIG. 12 depicts a flow enhancement member 118 in which the ribs or fins are replaced with recesses 122 that are perpendicular to the direction of flow of the cooling fluid. The features or interruptions along the outer surfaces of the angled legs 72 may assist in reducing the boundary layer along the legs and thus improve the efficiency of the cooling process.

In a further embodiment, although the coils 25 are depicted with the wrap 39 surrounding each surface of the coils, in some embodiments the wrap may only extend along the first leg sections 34 and the second sections 35 to define relatively smooth surfaces along those sections. In other embodiments, the coils 25 may not have a wrap 39 on the first leg sections 34 and the second sections 35. In still other embodiments, none of the coil 25 may have a wrap 39 on any surface thereof.

INDUSTRIAL APPLICABILITY

The industrial applicability of the rotary electric machine described herein will be readily appreciated from the foregoing discussion. The foregoing discussion is applicable to rotary electric machines such as switched reluctance motors 10 in which it is desirable to increase the electrical efficiency and performance of the rotary electric machine as well as improve the lifespan of the rotary electric machine.

The configuration of the coil 25 together with the flow enhancement members 70 improve electrical efficiency and performance and increase the lifespan of the rotary electric machine by improving the cooling of the machine. As a result of the improved cooling function, the rotary electric machine may be operated in a manner that will generate more power and more heat without a resultant decrease in lifespan.

In operation, the pump 111 directs cooling fluid from the tank 110 into the first and second inlets at the ports 95, 96 of the stator jacket 13 and travels through the spiral channel 102 to the bores 90 in the stator jacket. The cooling fluid passes radially through the bores 90 in the stator jacket 13 and the bores 18 in the stator 11 and into the inner reservoirs 85, 88 within the V-shaped first and second channels 55, 56. The cooling fluid is forced axially through the gaps 76 between the coils 25 and the sidewalls of the angled legs 72 of the non-continuous flow enhancement members 80, 81 and axially out of the V-shaped first and second channels 55, 56. The cooling fluid then passes as a result of gravity through the channels 100 in the outer housing 14 along the ends of the stator 11 and the rotor 12. After passing through the channels 100, the cooling fluid travels to the sump 101 and back to the tank 110.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A rotary electric machine comprising:
a stator having stator body, the stator body having a plurality of stator poles extending radially away from the stator body;
a rotor positioned within the stator and having a plurality of rotor poles;
a plurality of coils, a coil being positioned about each stator pole, each coil having a plurality of electrically conductive wires defining a group of wires, the group of wires being wrapped around its respective stator pole to define a plurality of turns of the group of wires about the stator pole, each coil further having a pair of major sections and a pair of minor sections, each minor section interconnecting the pair of major sections, and each major section being positioned adjacent a major section of an adjacent coil, the coil further including an inner surface in proximity to its respective stator pole, a compound outer surface along the pair of major sections, an insertion end positioned generally adjacent the stator body, and a rotor end positioned opposite the insertion end, the insertion end and the rotor end interconnecting the inner surface to the compound outer surface, the compound outer surface having a first leg section and a second leg section, the first leg section extending generally from the insertion end towards the rotor end and the second leg section extending from the rotor end generally towards the first leg section, the first leg section and the second leg section being at an angle to each other, and an insulating layer along the compound outer surface of the coil;
the compound outer surfaces of each pair of adjacent coils include a compound outer surface with a first leg section and a second leg section at an angle to the first leg section, the first leg sections defining a first v-shaped channel and the second leg sections defining a second v-shaped channel, the first and second v-shaped channels extending along adjacent major sections of each adjacent pair of coils, the first v-shaped channel being disposed radially outward of the second v-shaped channel and the apexes of the first and second v-shaped channel are oriented toward each other and in fluid communication with each other; and
a plurality of flow enhancement member including a first flow enhancement member being disposed within the first v-shaped channel between the adjacent major sections of each pair of adjacent coils and a second flow enhancement member disposed in the second v-shaped channel between major section of each pair of adjacent coils, each of the first and second flow enhancement members defining a gap between the compound outer surface of one of the coils and the flow enhancement member, the first flow enhancement member and the second flow enhancement member each having a generally triangular cross-section and disposed in the first v-shaped channel and the second v-shaped channel respectively so that the apexes of the first and second flow enhancement members are oriented toward and radially spaced apart from each other.

2. The rotary electric machine of claim 1, wherein each flow enhancement member includes a plurality of standoffs to space the flow enhancement member from the compound outer surfaces of each adjacent pair of coils to define the gap between the compound outer surface of one of the coils and the flow enhancement member.

3. The rotary electric machine of claim 2, wherein each flow enhancement members includes a generally round enlarged portion at their respective apexes that forms at least a portion of the plurality of standoffs.

4. The rotary electric machine of claim 1, further including at least one inlet port that extends through a portion of the stator and is in fluid communication with the channels.

5. The rotary electric machine of claim 4, wherein the at least one inlet port extends through the stator at approximately a longitudinal midpoint of the channels.

6. The rotary electric machine of claim 4, wherein the channel includes an outlet port at each opposite end of the channels.

7. The rotary electric machine of claim 6, wherein the flow enhancement member disposed within each channel between the adjacent major sections of each pair of adjacent coils is a non-continuous flow enhancement member and includes a first segment axially extending from a first end of the v-shaped channels to approximately the midpoint of the v-shaped channels and a second segment axially extending from a second end of the v-shaped channels to approximately the midpoint of the v-shaped channels, the second segment spaced from the first segment proximate the midpoint.

8. The rotary electric machine of claim 7, further comprising an inner reservoir between the first segment and the second segment of the flow enhancement member, the inner reservoir being in fluid communication with the inlet port.

9. The rotary electric machine of claim 8, wherein each flow enhancement member includes a plurality of standoffs to space the flow enhancement member from the compound outer surfaces of each adjacent pair of coils to define the gap between the compound outer surface of one of the coils and the flow enhancement member.

10. The rotary electric machine of claim 8, wherein the inlet port is radially aligned with the inner reservoir.

11. The rotary electric machine of claim 4, further comprising an annular stator jacket surrounding and engaging an outer circumferential surface of the stator, the annular stator jacket including openings aligned with and in fluid communication with the at least one inlet port.

12. The rotary electric machine of claim 11, further comprising an outer housing circumferentially surrounding the annular stator jacket, the annular stator jacket and the outer housing defining at least one circumferential channel therebetween.

13. The rotary electric machine of claim 12, wherein the at least one circumferential channel extends between the annular stator jacket and the outer housing in a spiral manner.

14. The rotary electric machine of claim 1, wherein each coil includes a rigid formed outer surface.

15. The rotary electric machine of claim 1, wherein the first and second flow enhancement members have a general triangular cross-section, the first flow enhancement member and the second flow enhancement member accommodated in the respective first and second v-shaped channel with the bases of the first and second flow enhancement member are oriented away from each other.

16. A rotary electric machine comprising:

a stator having stator body, the stator body having a plurality of stator poles extending radially away from the stator body;

a rotor positioned within the stator and having a plurality of rotor poles;

a plurality of coils, a coil being positioned about each stator pole, each coil having a plurality of electrically conductive wires defining a group of wires, the group of wires being wrapped around its respective stator pole to define a plurality of turns of the group of wires about the stator pole, each coil further having a pair of major sections and a pair of minor sections, each minor section interconnecting the pair of major sections, and each major section being positioned adjacent a major section of an adjacent coil, the coil further including an inner surface in proximity to its respective stator pole, a compound outer surface along the pair of major sections, an insertion end positioned generally adjacent the stator body, and a rotor end positioned opposite the insertion end, the insertion end and the rotor end interconnecting the inner surface to the compound outer surface, the compound outer surface having a first leg section and a second leg section, the first leg section extending generally from the insertion end towards the rotor end and the second leg section extending from the rotor end generally towards the first leg section, the first leg section and the second leg section being at an angle to each other, and a rigid insulating layer along the compound outer surface of the coil;

the compound outer surfaces of each pair of adjacent coils includes a compound outer surface with a first leg section and a second leg section at an angle to the first leg section, the first leg section, defining a first v-shaped channel and the second leg section defining a second v-shaped channel, the first and second v-shaped channels extending along adjacent major sections of each adjacent pair of coils, the first v-shaped channel being disposed radially outward of the second v-shaped channel and the apexes of the first and second v-shaped channels are oriented toward each other and in fluid communication with each other;

a plurality of flow enhancement members including a first flow enhancement member disposed within the first v-shaped channel between the adjacent major sections of each pair of adjacent coils and a second flow enhancement member disposed in the second v-shaped channel between the adjacent major section of each pair of adjacent coils, each flow enhancement member defining a gap between the compound outer surface of one of the coils and the flow enhancement member, the first flow enhancement member and the second flow enhancement member each having a generally triangular cross-section and disposed in the first v-shaped channel and the second v-shaped channel respectively so that the apexes of the first and second flow enhancement members are oriented toward and radially spaced apart from each other;

a port adjacent at least one end of the channel; and a fluid system including a cooling fluid that flows through the gap and through the port.

17. The rotary electric machine of claim 16, wherein the port adjacent the at least one end of the channels is an outlet port.

18. The rotary electric machine of claim 16, wherein each flow enhancement member includes a plurality of standoffs to space the flow enhancement member from the compound outer surfaces of each adjacent pair of coils to define the gap between the compound outer surface of one of the coils and the flow enhancement member.

19. The rotary electric machine of claim 16, further including an inlet port that extends through a portion of the stator and is in fluid communication with the channels.

* * * * *